United States Patent [19]

Sabel et al.

[11] 4,332,312
[45] Jun. 1, 1982

[54] REVERSE SPEED SHIFT DEVICE FOR A MOTOR VEHICLE CHANGE-SPEED GEARBOX

[75] Inventors: Gustav Sabel; Horst Schellens, both of Cologne, Fed. Rep. of Germany

[73] Assignee: Ford Motor Company, Dearborn, Mich.

[21] Appl. No.: 151,027

[22] Filed: May 19, 1980

[30] Foreign Application Priority Data

May 28, 1979 [DE] Fed. Rep. of Germany ....... 2921581

[51] Int. Cl.³ .............................................. B60K 41/26
[52] U.S. Cl. ................................... 192/4 C; 74/411.5
[58] Field of Search ............ 192/4 C, 4 A, 4 R, 13 R; 74/411.5, 96, 104, 107

[56] References Cited

U.S. PATENT DOCUMENTS

| | | | |
|---|---|---|---|
| 1,721,592 | 7/1929 | Gattrell | 192/4 C |
| 3,463,277 | 8/1969 | Allori et al. | 192/4 A |
| 3,645,367 | 2/1972 | Coleman et al. | 192/4 A |
| 4,192,410 | 3/1980 | Poirier | 192/4 A |
| 4,221,283 | 9/1980 | Nordkvist et al. | 192/4 C |

Primary Examiner—George H. Krizmanich
Attorney, Agent, or Firm—Frank G. McKenzie; Donald J. Harrington

[57] ABSTRACT

A reverse idler gear lever pivots to move a reverse gear into engagement with an after-running gearwheel mounted on a layshaft. A connecting arm is pinned to the idler lever and defines a slot within which a pin mounted on a brake lever moves. The pin engages a bowspring within the slot and transmits a force to the brake lever until the bowspring is cleared by the pin. The spring force operates to pivot the brake lever and to bring a brake surface into abutting contact with the after-running gearwheel. Alternatively, a spring force is developed on a cam surface as the brake lever moves relative to the connecting arm.

7 Claims, 2 Drawing Figures

4,332,312

REVERSE SPEED SHIFT DEVICE FOR A MOTOR VEHICLE CHANGE-SPEED GEARBOX

BACKGROUND OF THE INVENTION

1. Field of the Invention

This invention relates to a reverse speed shift device for a motor vehicle change-speed gearbox having a brake device actuated during the shift movement to brake an after-running gearbox shaft.

2. Description of the Prior Art

A reverse speed shift device, described in German Patent Application No. 23 36 250, operates to engage reverse drive gears during the preselection movement of the shift lever into the reverse shift plane. This movement loads a spring through a selector finger, which influences a selector fork mounted on the selector sleeve of the gearbox input shaft. The spring force skews the selector fork to brake the gearbox input shaft by operation of the increased friction force.

This reverse shift device has the advantage that braking of the afterrunning gearbox shaft is initiated during the preselection movement of the reverse speed. However, it has the disadvantage that the components necessary for the normal shift actuation are utilized as a brake device, with the result that they must be of complicated and costly construction.

It is customary in motor vehicle construction for a vehicle model to have engines of different capacities and correspondingly adapted clutches but substantially identical change-speed gearboxes. In many of the various engine-clutch gearbox combinations it has been discovered that scarcely any difficulties arise when an unsynchronized reverse speed is selected. However, with certain engine-clutch-gearbox combinations, particularly those in which the clutch plate has high inertia as a result of a longer after-running time of the connected gearbox shafts, difficulties in the form of disturbing grating noises are experienced when the driver attempts to engage the unsynchronized reverse speed during this after-running period.

Because the driver of a motor vehicle can only be expected to wait a brief period between disengaging a forward speed and engaging the reverse speed, it was necessary to find a solution to this problem that reduces this prolonged after-running time in a specific engine-clutch-gearbox combination.

A shift device disclosed in German patent application OS No. 28 09 915 discloses a friction device for braking a transmission shaft when a spring loaded toggle contacts the shaft. The toggle contacts a cylindrical portion of the shaft and is actuated by means of a spacer that engages a recess on a second shaft. The braking force is continuously applied and is removed only when the recess is removed from the spacer.

SUMMARY OF THE INVENTION

It is therefore an object of my invention to produce a low cost brake device installable as a service modification for the after-running gearbox shaft in a given motor vehicle change-speed gearbox without unduly modifying the gearbox assembly.

This aim is achieved according to the invention by providing an articulate connection between the selector fork for the reverse speed sliding gear and an approximately horizontally extending connecting arm. The arm is attached through a frictional slot-spring-pin connection to an approximately vertically extending brake lever. The brake lever is pivotable about a transverse axis in the gearbox housing. Upon being pivoted the lever forces a brake surface formed on one of its arms into braking engagement with a radial lateral face of the layshaft gearwheel block. A reliable braking of the after-running gearbox shafts and gearwheels is achieved during the engaging movement of the reverse speed gear. The arrangement of the brake lever and the choice of a transmission ratio at which the brake operates can be adapted to the requirements of the particular case. In the normal version of the change-speed gearbox only a bore in the selector fork for the reverse speed sliding gear and a bore in the gearbox housing need be provided in addition to the standard transmission with which this invention may be combined and added as a service modification.

The resilient connection between the connecting arm and braking lever may be provided according to a first embodiment in the form of a slot in the connecting arm in which a bowspring is fixed firmly at its one end and slidably at its other end. The spring cooperates with a pin movable in the slot which is mounted on the brake lever.

The resilient connection according to a second embodiment may be produced by the cooperation of the slot in the connecting arm in which the pin mounted on the brake lever can slide. The connecting lever defines in the plane of the slot a cam surface against which the end of the brake lever carrying the pin is engaged under spring pressure.

BRIEF DESCRIPTION OF THE DRAWING

The invention is explained more fully with reference to an exemplary embodiment illustrated in the accompanying drawing, wherein.

DESCRIPTION OF THE PREFERRED EMBODIMENT

Figure 1:
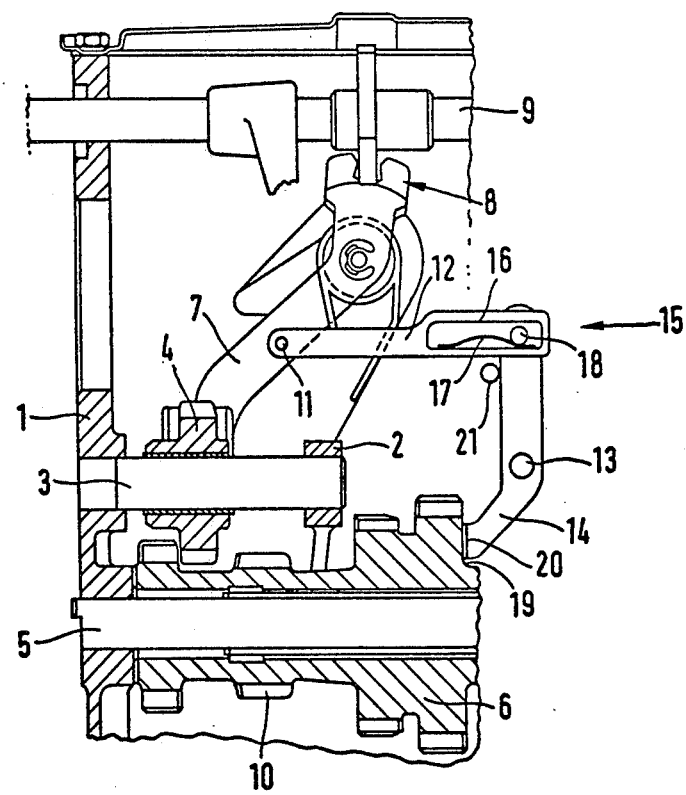
FIG. 1 shows a vertical partial section through a motor vehicle change-speed gearbox in the region of the reverse speed shift device having the schematically indicated brake device.

FIG. 1 shows the part of a gearbox housing of a motor vehicle change-speed gearbox in which the stationary axle 3 for a reverse speed sliding gear 4 is arranged between a gearbox outer wall 1 and a bearing block 2. The stationary axle 5 of a layshaft gearwheel block 6 is arranged in the external walls of the gearbox housing in a known manner.

The reverse speed sliding gear 4 can be slid axially in a conventional manner by a selector lever 7 which can be pivoted through a corresponding preselector device 8 by a selector shaft 9.

During its axial sliding the reverse speed sliding gear 4 becomes meshed initially with a wide gearwheel 10 on the layshaft gearwheel block 6 and then, after additional axial movement, with a narrower gearwheel on the main shaft (not shown).

The subsequently installable brake device for braking the after-running gearbox shaft comprises a connecting arm 12, which is articulately connected to the selector lever 7 through a pin 11, and a brake lever 14, which is mounted pivotably on a bolt 13 in the gearbox housing 1. Arm 12 and lever 14 are connected through a frictional slot-spring-pin connection 15. In FIG. 1 the frictional connection 15 includes a slot 16, a bowspring 17 arranged therein and a pin 18 movable in the slot and mounted on the brake lever 14. The bowspring 17 is fixedly secured in the slot 16 at its one end and slidably at its other end. Slot 16 provides a surface spaced from bowspring 17 onto which surface pin 18 is held whereby the spring is deflected as arm 12 is moved relative to lever 14.

During the engaging movement of the reverse speed sliding gear, the selector lever 7 rotates counterclockwise, driving the arm 12 rightwardly thereby forcing the bowed portion of bowspring 17 to engage pin 18. The brake lever 14 pivots about the bolt 13 and presses axially against a radial lateral surface 19 of a gearwheel of the layshaft gearwheel block 6. The end of the brake lever 14 pressing against the lateral surface 19 may be provided with a brake lining surface 20. In this way, the gearwheel block 6 can be braked to a complete stop before gear 4 is moved by lever 7 into meshing engagement with gearwheel 10.

As soon as the shift movement exceeds the force developed between pin 18 and the bowspring 17, the pin 18 can slide along in the slot 16 and the pressure of the brake lever 14 ceases. When the reverse speed ratio is disengaged, the pin 18 is moved back in the slot 16 to its initial position by the lever 14.

Figure 2:
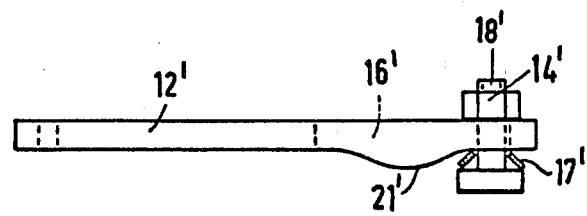
FIG. 2 shows another embodiment of the frictional connection between the connecting arm and the brake lever.

FIG. 2 shows another embodiment of the frictional connection 15 on the connecting arm. A connecting arm 12' again defines a slot 16', but has, on the side opposite from the brake lever 14', a cam surface 21' against which the pin 18' is slidable engaged by the force of spring 17'.

The function in this case is the same as that previously described. When the connecting arm 12' is moved to the right, the brake lever 14' is at first pivoted about pin 13 until the force of the spring 17' is overcome. When the pin 18' is displaced within the slot 16' beyond the apex of the cam surface 21', the brake action on the lateral surface 19 is removed.

The described reverse speed shift device has the advantage that the normal shift device of a motor vehicle change-speed gearbox can be retained unmodified for the major part of the production except for the addition of two bores, a bore in the selector lever 7 for the pin 11 and a bore in the gearbox housing 1 for the bolt 13. The arrangement of a brake device to brake the after-running gearbox shaft and gearwheels necessary for a specific engine-clutch-gearbox combination is made possible by the subsequent installation of two simple members, the connecting arm 12 and the brake lever 14, with the resilient, removable, driving connecting therebetween.

Having thus described a preferred embodiment of my invention, what I claim and desire to secure by U.S. Letters Patent is:

1. A brake device for stopping an after-running transmission gearwheel comprising:
   a first gear journalled on a shaft for rotation and axial displacement thereon, being engageable with a second gear formed on the gearwheel as said first gear is moved axially;
   a pivotably mounted selector lever adapted to cause axial displacement of said first gear as said selector lever pivots;
   a pivotably mounted brake lever having a surface that is forced into and released from frictional contact with a surface on the after-running gearwheel as said brake lever pivots; and
   a connecting arm joined to said selector lever and having a removable resilient connection to said brake lever whereby said brake lever applies a braking force to the gearwheel upon pivoting of said selector lever.

2. The brake device according to claim 1 wherein the resilient connection of said connecting arm to said brake lever includes:
   a spring mounted on said connecting arm;
   a pin mounted on and extending from said brake lever; and
   slot means for holding said pin and said spring engaged whereby a resilient force tending to rotate said brake lever is developed as said connecting arm is moved relative to said brake lever.

3. The brake device according to claim 1 wherein the resilient connection of said connecting arm to said brake lever includes:
   a spring mounted on said brake lever;
   a pin mounted on and extending from said connecting arm; and
   means for holding said pin and said spring engaged whereby a resilient force tending to rotate said brake lever is developed as said connecting arm is moved with respect to said brake lever.

4. The brake device according to claims 2 or 3 wherein said holding means comprises a slot within which said spring is mounted and into which said pin extends, said slot having a surface spaced from said spring onto which the pin is held as said spring is deflected by movement of said connecting arm relative to said brake lever, whereby said pin is held in contact with said spring.

5. The brake device according to claim 1 wherein the resilient connection of said connecting arm to said brake lever includes:
   a slot formed in the connecting arm;
   a pin mounted on and extending from said brake lever, slidable within said slot;
   a cam surface formed on said connecting arm; and
   a spring biasing said pin into contact with said cam surface whereby a resilient force tending to rotate said brake lever is developed as said connecting arm is moved relative to said brake lever.

6. The brake device according to claim 1 wherein said brake lever has a brake lining mounted on one operating end thereof whereby said brake lining contacts a lateral face of the gearwheel as said brake lever pivots said operating end toward said gearwheel.

7. The brake device according to claim 1 wherein the resilient connection of said connecting arm to said brake lever includes:
   a pin mounted on and extending from said brake lever; and
   a spring adapted to be displaced by said pin during a first portion of the movement of said arm relative to said brake lever whereby a resilient force tending to rotate said brake lever is developed, the force being removed when said arm moves relative to said brake lever beyond the maximum displacement position of said spring.

* * * * *